United States Patent
Isherwood, Jr. et al.

(10) Patent No.: US 9,965,502 B2
(45) Date of Patent: *May 8, 2018

(54) CONTENT CLASS FOR OBJECT STORAGE INDEXING SYSTEM

(71) Applicant: Hitachi Data Systems Corporation, Santa Clara, CA (US)

(72) Inventors: Benjamin Isherwood, Jr., Tewksbury, MA (US); Yury Kats, Belmont, MA (US); Rich Rogers, Stoughton, MA (US)

(73) Assignee: HITACHI VANTARA CORPORATION, Santa Clara, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/438,907

(22) PCT Filed: Feb. 27, 2013

(86) PCT No.: PCT/US2013/027866
§ 371 (c)(1),
(2) Date: Apr. 28, 2015

(87) PCT Pub. No.: WO2014/133495
PCT Pub. Date: Sep. 4, 2014

(65) Prior Publication Data
US 2015/0278311 A1 Oct. 1, 2015

(51) Int. Cl.
*G06F 17/30* (2006.01)
*G06F 12/14* (2006.01)

(52) U.S. Cl.
CPC .... *G06F 17/30321* (2013.01); *G06F 12/1425* (2013.01); *G06F 17/30424* (2013.01);
(Continued)

(58) Field of Classification Search
USPC .......................................................... 707/741
See application file for complete search history.

(56) References Cited

U.S. PATENT DOCUMENTS 6,510,434 B1  1/2003  Anderson et al.
7,689,602 B1  3/2010  Sim-Tang
(Continued)

FOREIGN PATENT DOCUMENTS

JP  9-319757 A  12/1997
JP  2002-269123 A  9/2002
(Continued)

OTHER PUBLICATIONS

A Translation of the Japanese Office Action received in corresponding Japanese Application No. 2015-559219 dated Mar. 7, 2017.
(Continued)

*Primary Examiner* — Hung T Vy
(74) *Attorney, Agent, or Firm* — Mattingly & Malur, PC

(57) ABSTRACT

A storage system comprises a controller; a memory; and one or more objects each including content data and metadata. The metadata is used to construct user-defined content properties, each content property providing an ability to extract a specific metadata field from the objects by referring to a user-defined content property name of the content property. The content properties are organized into user-defined content classes, each content class grouping a set of content properties into a named category under a user-defined content class name. The controller is operable to index the content properties of the content classes to create an index. The content properties being indexed are identified by the content property names. In some embodiments, the controller is operable to de-dupe the index, for content properties having same values expressed differently in different metadata formats, by directing the differently
(Continued)

expressed values to same index field under same content property name.

20 Claims, 10 Drawing Sheets

(52) U.S. Cl.
CPC .. *G06F 17/30525* (2013.01); *G06F 17/30607* (2013.01); *G06F 17/30705* (2013.01); *G06F 17/30882* (2013.01); *G06F 17/30911* (2013.01); *G06F 17/30997* (2013.01); *G06F 2212/1052* (2013.01)

(56) References Cited

U.S. PATENT DOCUMENTS

| | | | |
|---|---|---|---|
| 2004/0267798 A1* | 12/2004 | Chatterjee | G06F 17/241 |
| 2008/0147614 A1 | 6/2008 | Tam et al. | |
| 2009/0112858 A1 | 4/2009 | Zhang et al. | |
| 2010/0191779 A1* | 7/2010 | Hinrichs | G06F 3/0605 707/822 |
| 2011/0106802 A1 | 5/2011 | Pinkney et al. | |
| 2011/0153582 A1* | 6/2011 | Buchmann | G06F 17/30525 707/706 |
| 2012/0166403 A1 | 6/2012 | Kim et al. | |
| 2014/0289232 A1 | 9/2014 | Lu et al. | |

FOREIGN PATENT DOCUMENTS

| | | |
|---|---|---|
| JP | 2003-296355 A | 10/2003 |
| JP | 2009-75678 A | 4/2009 |
| JP | 2010-272141 A | 12/2010 |

OTHER PUBLICATIONS

Extended European Search Report received in corresponding European Application No. 13876507.8 dated Nov. 21, 2016.
Luk, Robert W. P. et al, "A Survey in Indexing and Searching XML Documents", Journal of the American Society for Information Science and Technology, Jan. 1, 2002, pp. 415-437, vol. 53, No, 6.
Garcia-Molina, H. et al., "Database Systems the Complete Book Second Edition—Chapter 11—The Semi Structured-Data Model" Jun. 15, 2008, pp. 483-515.
Catania, B. et al., "XML Document Indexes: A Classification", IEEE Internet Computing, Sep. 1, 2005, pp. 64-71, vol. 9, No. 5.
Translation of Japanese Office Action received in corresponding Japanese Application No. 2015-559219 dated Nov. 22, 2016.
Ito, K., "Multimedia Search System Based on One person and Metadata Analysis", Proceedings of Workshop of the Institute of Electronics, Information and Communication Engineers, Jul. 10, 2003, pp. 253-258, vol. 103, No. 191.
Communication Pursuant to Article 94(3) EPC received in corresponding European Application No. 13 876 507.8 dated Oct. 16, 2017.

* cited by examiner

CONTENT CLASS FOR OBJECT STORAGE INDEXING SYSTEM

BACKGROUND OF THE INVENTION

The present invention relates generally to storage systems and, more particularly, to the use of content classes to provide structure to unstructured content and its metadata for objects in storage system such as a replicated object storage system.

Object storage systems can contain a wide variety of unstructured content. This unstructured content can also contain associated metadata that helps describe the content further. With this wide variety of content and associated metadata, it becomes difficult to provide a general mechanism that allows for indexing of the content that does not dedicate a large percentage of the storage resources for the index.

BRIEF SUMMARY OF THE INVENTION

Exemplary embodiments of the invention provide a mechanism to define a blueprint that will construct structure to the unstructured content of an object and its metadata. This mechanism is called "Content Classes." These classes consist of a set of user-defined "Content Properties." Each property provides the ability to extract a specific metadata field from objects (e.g., any custom metadata XML tag), index it efficiently under a user-defined name with strong typing, and make that field multi-dimensionally query-able via a user interface and a programmatic query interface.

In accordance with an aspect of the present invention, a storage system comprises a controller; a memory; and one or more objects, each object including content data and metadata. The metadata is used to construct a plurality of user-defined content properties, each content property providing an ability to extract a specific metadata field from the one or more objects by referring to a user-defined content property name of the content property. The content properties are organized into user-defined content classes, each content class grouping a set of content properties into a named category under a user-defined content class name. The controller is operable to index the content properties of the content classes to create an index. The content properties being indexed are identified by the content property names.

In some embodiments, the controller is operable to de-dupe the index, for content properties having same values expressed differently in different metadata formats, by directing the differently expressed values to a same index field under a same content property name. Each content property includes, in addition to a name field to specify the content property name, at least one of: an expression field to identify how the content property's value is to be extracted from content of the metadata; a data type field to specify a data type of the content property's value; a format field to specify formatting for numbers and date data types; or a multi-value field to specify whether the expression specified in the content property can evaluate to multiple values within the same metadata content. The controller is operable to search content of the one or more objects using the index of content properties. The content data and metadata are used to construct the plurality of user-defined content properties.

Another aspect of the invention is directed to an apparatus for indexing content of objects in a storage system having plurality of nodes. The nodes are grouped into a plurality of cluster systems each having multiple nodes. Each object includes content data and metadata. The metadata is used to construct a plurality of user-defined content properties, each content property providing an ability to extract a specific metadata field from the objects by referring to a user-defined content property name of the content property. The content properties are organized into user-defined content classes, each content class grouping a set of content properties into a named category under a user-defined content class name. The apparatus comprises a controller and a memory. The controller is operable to index the content properties of the content classes to create an index. The content properties being indexed are identified by the content property names.

In some embodiments, the controller is operable to de-dupe the index, for content properties having same values expressed differently in different metadata formats, by directing the differently expressed values to a same index field under a same content property name. The controller is operable to search content of the objects using the index of content properties. Each cluster system is logically partitioned into a plurality of namespaces, each namespace including a collection of objects and has associated therewith a private file system with respect to other namespaces in the cluster system. A tenant is a grouping of namespaces. The content classes provide a way to view content property configurations of the content properties grouped under the content classes across the namespaces in the tenant from a single location, instead of viewing each content property configuration at each individual namespace.

Another aspect of this invention is directed to a storage system having a plurality of nodes. The nodes are grouped into a plurality of cluster systems each having multiple nodes. Each object includes content data and metadata. The metadata is used to construct a plurality of user-defined content properties, each content property providing an ability to extract a specific metadata field from the objects by referring to a user-defined content property name of the content property. The content properties are organized into user-defined content classes, each content class grouping a set of content properties into a named category under a user-defined content class name. A method for indexing content of objects comprises indexing the content properties of the content classes to create an index. The content properties being indexed are identified by the content property names.

These and other features and advantages of the present invention will become apparent to those of ordinary skill in the art in view of the following detailed description of the specific embodiments.

DETAILED DESCRIPTION OF THE INVENTION

Figure 1:
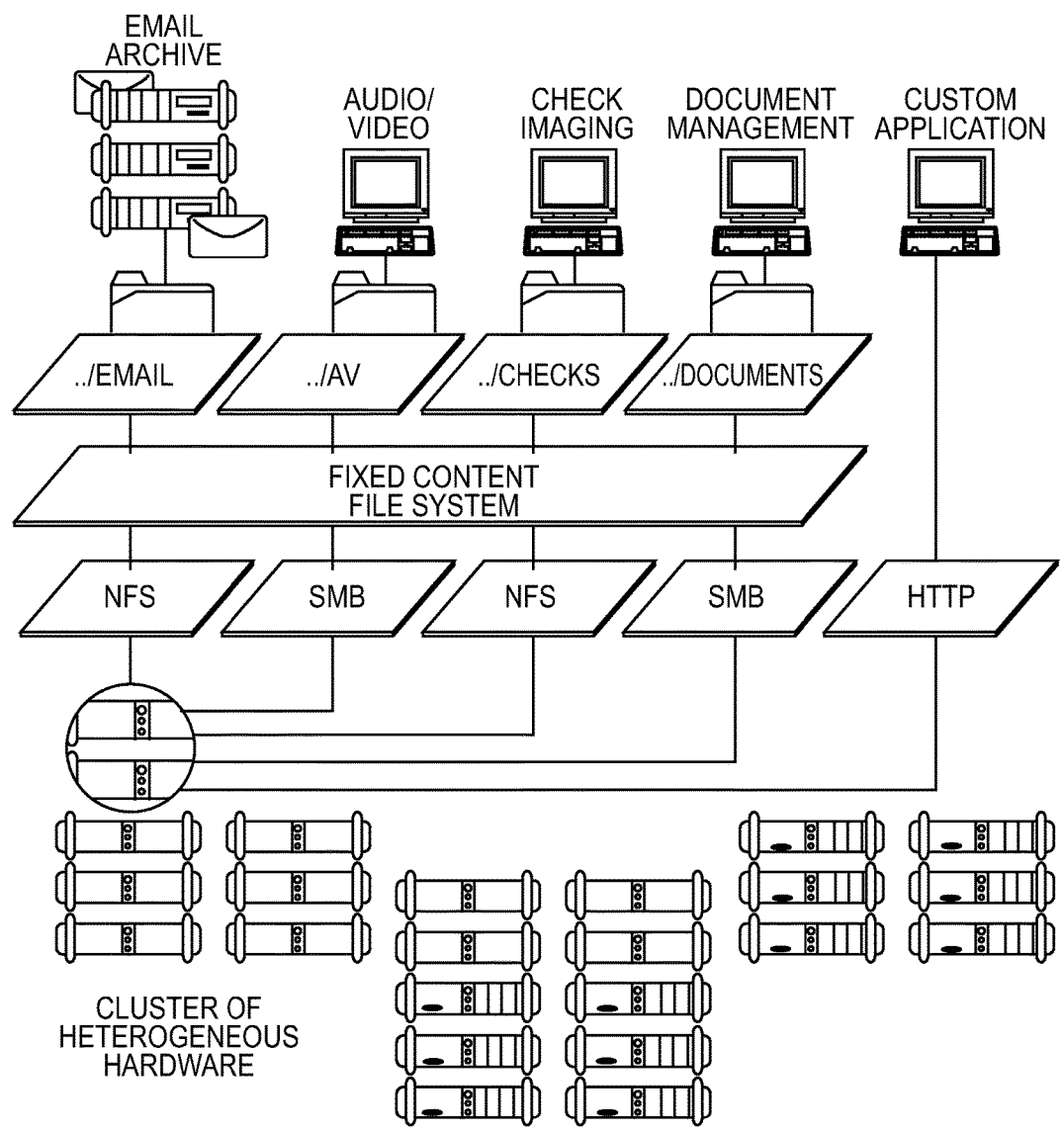
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for providing a mechanism called content classes to define a blueprint that will construct structure to the unstructured content of an object and its metadata and to facilitate efficient indexing and searching.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
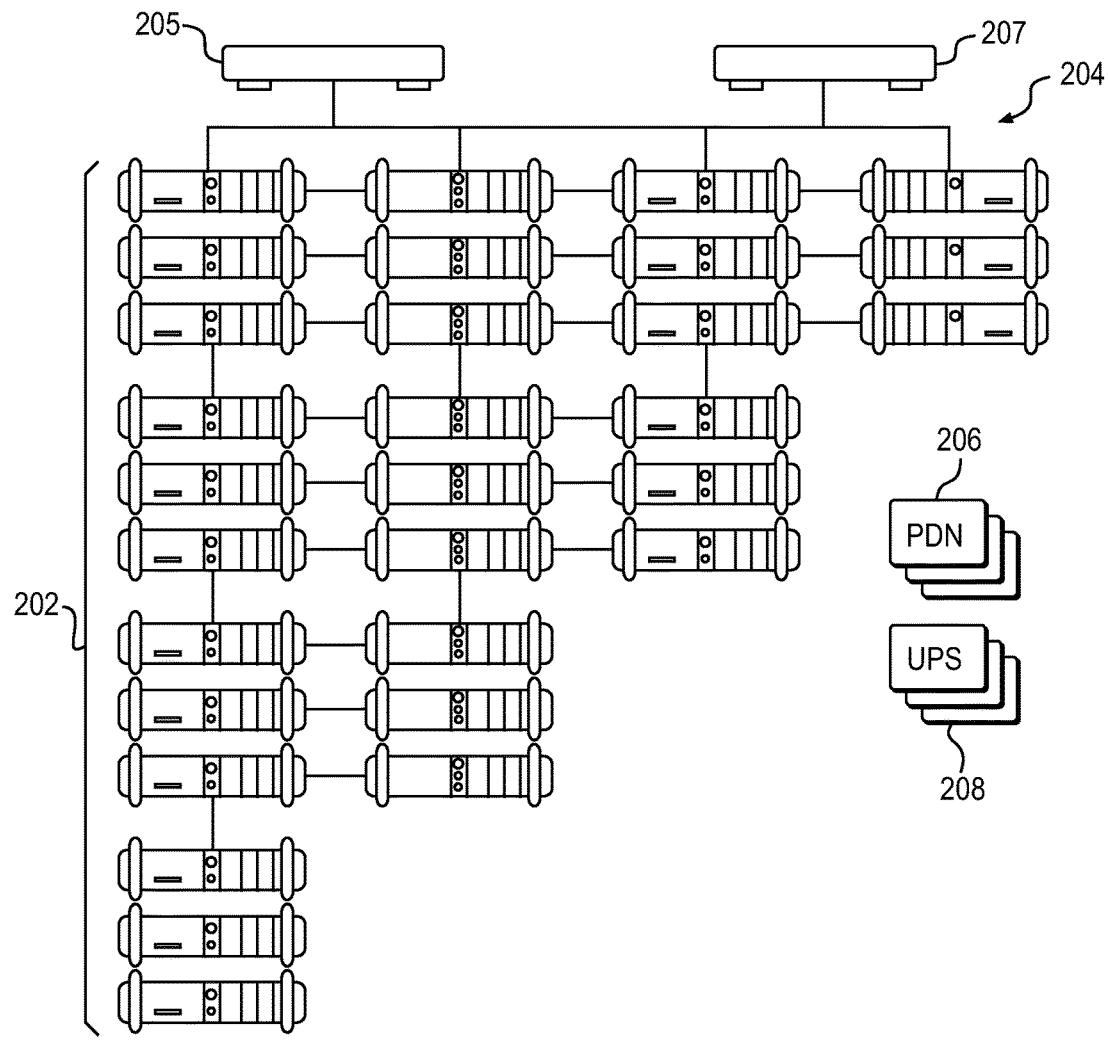
FIG. 2 is a simplified representation of a redundant array of independent nodes each of which is symmetric and supports an archive cluster application.

As described in commonly owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., CPU, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network.

In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API (Application Program Interface), or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
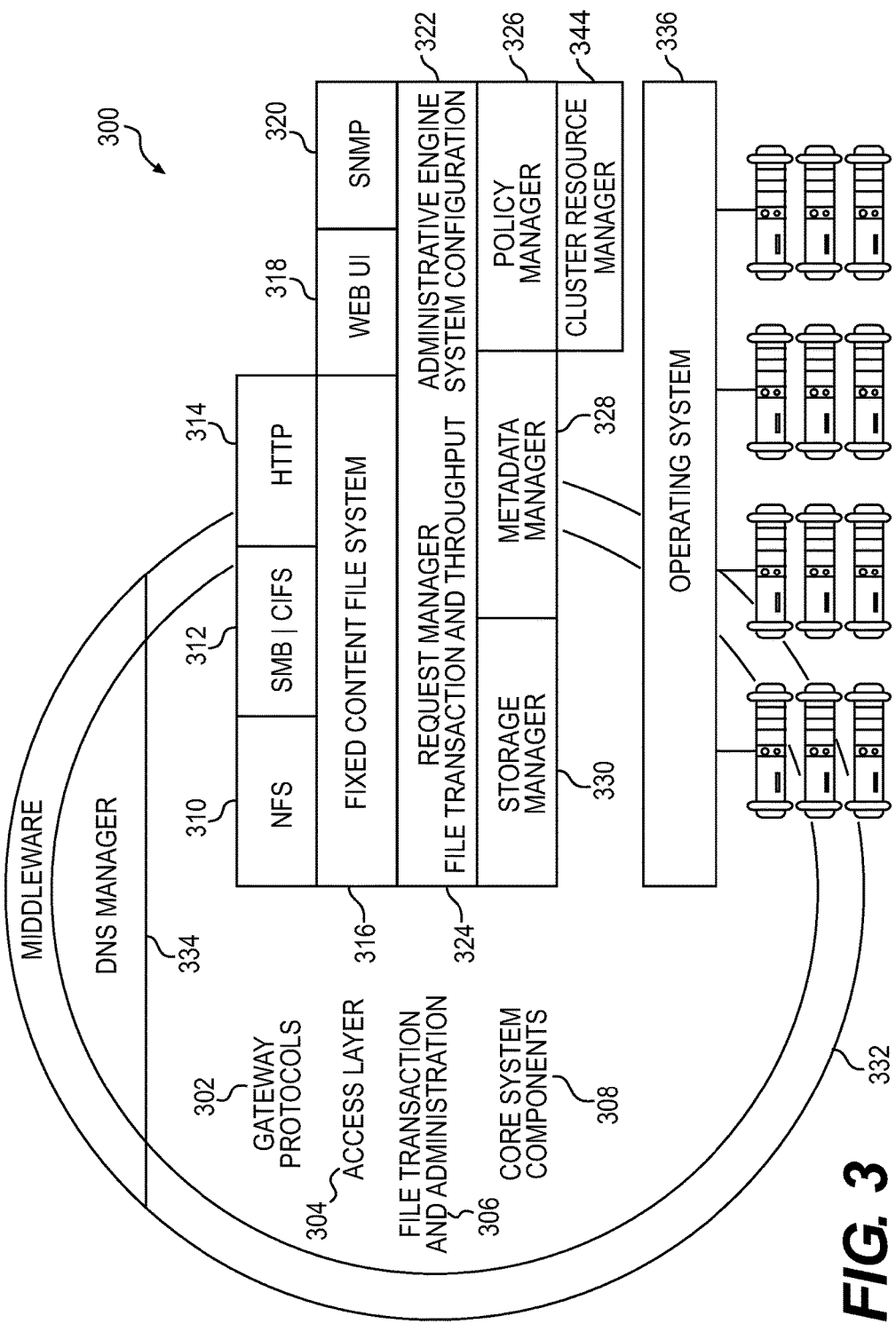
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application instance executes on a base operating system 336, such as Linux, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A clusters primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication Nos. 2007/0189153 and U.S. Pat. No. 7,657,581, which are incorporated herein by reference.

A namespace (NS) is a logical partition of the cluster. A namespace essentially serves as a collection of objects particular to at least one defined application. As will be described, each namespace has a private file system with respect to other namespaces. Moreover, access to one namespace does not grant a user access to another namespace. An archive may have an upper bound on the number of namespaces allowed on a single cluster (e.g., up to 10,000). Authenticated Namespace (ANS) is a namespace (preferably HTTP-only) that requires authenticated data access. Default Namespace (dNS) is a namespace for use with data that is ingested into the cluster in other than REST (Representational State Transfer), where REST is a lightweight protocol commonly used for exchanging structured data and type information on the Web. Further, even if an application uses the REST interface, if a namespace is not specified during authentication to the cluster, all data can be stored in the default namespace. Tenant is a grouping of namespace(s) and possibly other subtenants. Top-Level Tenant (TLT) is a tenant which has no parent tenant, e.g., an enterprise. Subtenant is a tenant whose parent is another tenant; e.g., the enterprise's financing department. Default Tenant is the top-level tenant that contains only the default namespace. Cluster (or system) is a physical archive instance, such as described above. See US2011/0106802, which is incorporated herein by reference in its entirety.

At a macro level, all namespaces can be considered as the same or substantially the same entities with the same qualities and capabilities. Generally, and as will be seen, a namespace has a set of associated capabilities that may be enabled or disabled as determined by an appropriately credentialed administrator. A single namespace can host one or more applications, although preferably a namespace is associated with just one defined application (although this is not a limitation). A namespace typically has one or more of the following set of associated capabilities that a namespace administrator can choose to enable or disable for a given data account: read (r)—includes reading files, directory listings, and exists/HEAD operations; write (w); delete (d); purge (p)—allows one to purge all versions of a file; privileged (P)—allows for privileged delete and privileged purge; and search(es).

Using namespaces, an administrator can create multiple domains for a cluster, which domains differ based upon the perspective of the user/actor. These domains include, for example, the following: access application, cluster admin, TLT admin, subtenant admin, and replication. The domain of the access application is a given namespace. A tenant preferably has a set of attributes: namespaces, administrative accounts, data access accounts, permission mask, roll-up of state, name, and quotas. A tenant may contain zero or more namespaces.

A namespace is a logical archive as viewed by an application. According to the subject matter herein, a particular namespace is distinct from a different namespace, and access to one namespace does not grant a user access to another namespace. Preferably, administration of a namespace is performed at the owning tenant level. Moreover, preferably a namespace may only be deleted if a count of objects associated with that namespace is zero. A namespace preferably also has the following attributes: permission mask, initial settings, other settings, display name, quota, logs, and stats. As noted above, the permission mask (r/w/d/p/P/s) is the set of settings global to the namespace and which mask an account's permissions. The initial settings identify a data protection level (DPL), a hashing scheme, and the like, that preferably remain persistent. The other settings refer to settings (such as retention, shred, versioning, indexing, and the like) that can be set on the namespace and then later changed. The display name is a name or other identifier for the namespace. The quota is either hard (in GB) or soft (in percent). The logs attribute identifies the system events related to the namespace that will be logged. The stats attribute identifies the statistics that are generated from namespace-related data, such as capacity, number of objects, and the like.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

ExternalFile: a file as perceived by a user of the archive;

InternalFile: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object.

Figure 4:
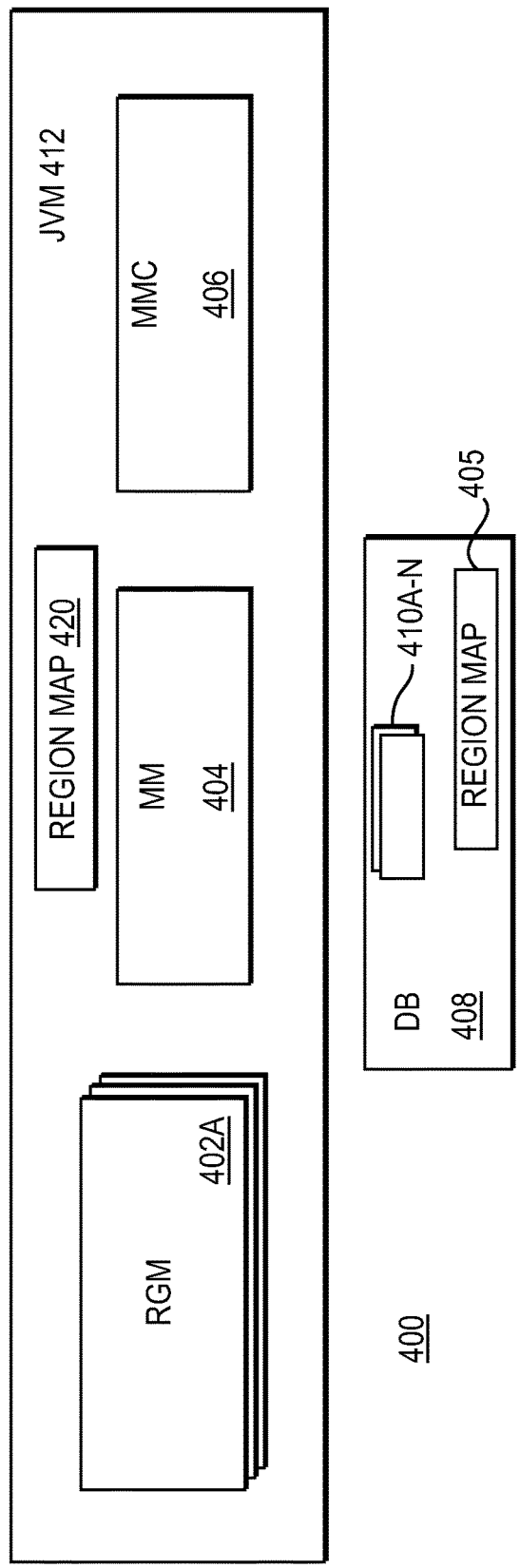
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Pat. No. 7,657,581.

III. Multiple User-Defined Metadata for Self-Describing Objects

Most object storage systems have the ability to associate metadata (data about data) to objects ingested in the system. This metadata is utilized to annotate the objects by providing more descriptive information about the object. The additional metadata will provide the needed information to help the consumer identify objects with similar criteria for activities such as analytics and discovery, thereby creating self-describing objects. As objects become more self-describing, this allows for usage of the objects for many different purposes and consumers that may desire to provide additional metadata.

Current methods to associate metadata with objects consist of forming the information into well-defined formats such as XML or JSON and associating it to the object as a single entity. In order for multiple consumers to utilize and augment the metadata, there must be coordination with all producers and consumers as to the format of the metadata; this ensures no incompatibilities are created or other metadata is destroyed. The coordination of changes between multiple consumers/producers can be difficult to accomplish as the number of consumers/producers grows, as those consumers/producers could be from separate and competing companies/products.

Without a standard or capability for separation, different applications MUST still be aware that tags/headers could exist that have the same name, but generated by another software entity.

Exemplary embodiments of the invention utilize the ability to associate multiple collections of metadata to objects. Each collection of metadata may provide a purposeful meaning called an annotation. A name is associated with these annotations allowing for multiple annotations per object. These annotations are named collections of user-defined or custom metadata for self-describing objects.

An object together with its annotations provides for creating self-describing objects within an object storage system. Each self-describing object contains enough information about itself to allow for utilization of the object without having to collect information about the object from other sources such as relational databases. This will enable the ability to construct systems and methods that can operate on the ever increasing volume of objects by only interacting with the object storage system.

A given consumer/producer can create its own named annotation(s) and format the content of the annotation into a form that is suitable to their needs (e.g., XML, JSON, comma-separated, etc.) without having to be concerned about the existence or non-existence of other consumer/producers. Nor is it required to have a standard layout/schema defined for the overall metadata. This will allow for multiple uses of the same data. For example, a digital image can be annotated with a wide variety of information by different software without the need to know that other software is using the image. The different annotations can contain information such as face recognition, cloud coverage, weather pattern, object identification, relationship to other images, and many other topics. With named annotations, the result will provide for easy modification of individual annotations without having to rewrite all annotations, provide for the ability to implement security for each annotation, and identify all objects that contain a certain kind of information using the name as search criteria. Furthermore, access security can be applied to the whole object as well as each individual annotation. With this level of security, it will be possible to provide different access control to construct different views of the same object based on the credentials of the requesting consumer.

In general, object storage systems have the concept of attaching metadata to objects. Each may have different ways of naming or structuring individual elements to provide an implied organization. Embodiments of this invention provide individual collections of metadata or annotations that allow for differing layout/formats for the metadata along with restricting access to these collections via Access Control List (ACL) constructs.

The usage of content in object storage systems is centered around utilizing network protocols for creation, reading, updating, and deleting objects. While many protocols can be used, this description will be centered around the Hyper Text Transmission Protocol (HTTP) and, more specifically, the architectural styled for distributed systems called Representational State Transfer (REST) common with many web-based client/server implementations and typical with cloud based storage. Each object system includes a processor, a memory, and at least one object each being associated with a plurality of named collections of user-defined metadata.

A search on the Internet will bring up many high-level and detailed descriptions of what HTTP/REST consist of, but the description below will focus on specific implementation relevant to this invention. Fundamentally, a request consists of a Universal Resource Locator (URL), an operation type, and an optional payload. In the context of an object storage system, the URL identifies the object for which the requested operation should be performed. The operations performed on objects include GET, PUT, HEAD (get system-metadata), POST (update), and DELETE.

Figure 5:
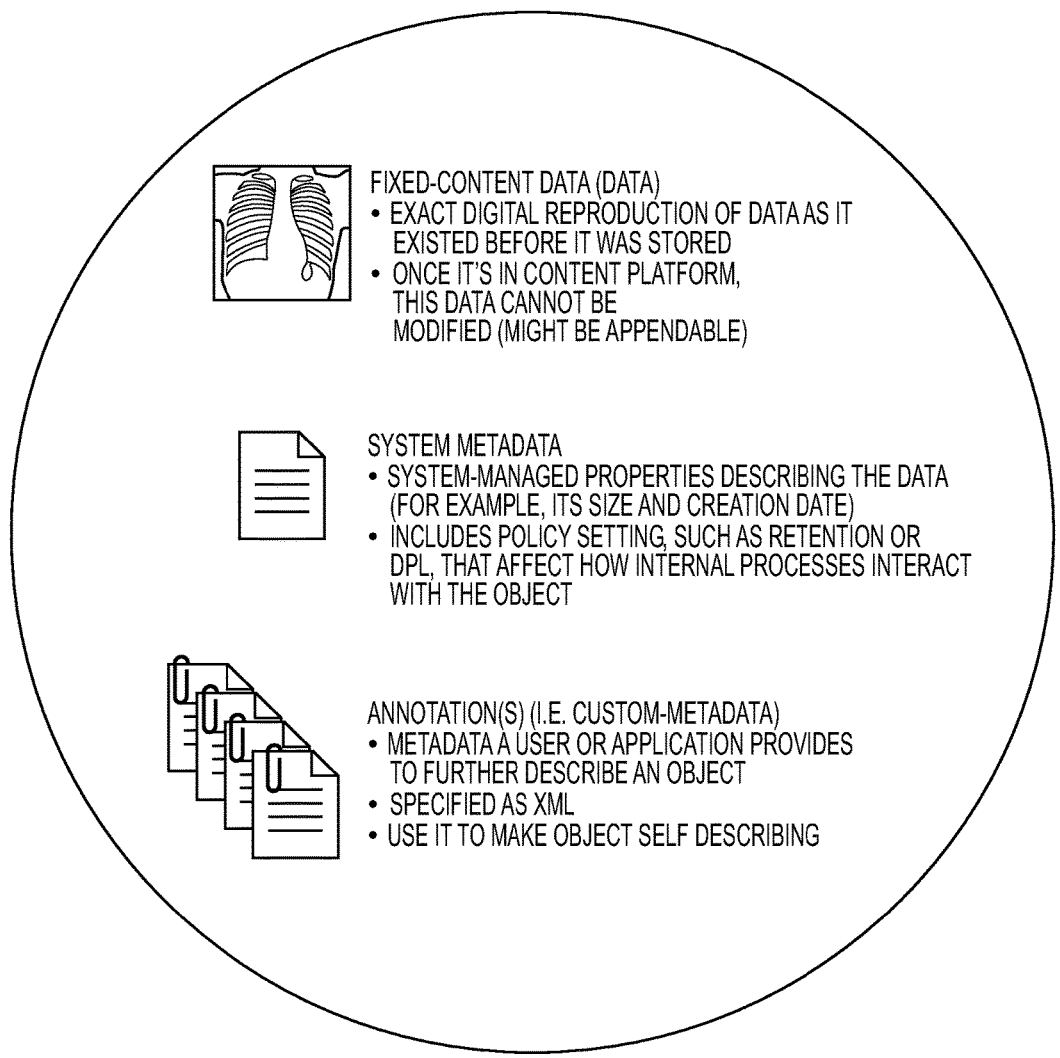
FIG. 5 shows an example of the core construction of an object.

FIG. 5 shows an example of the core construction of an object. Objects in an object system can have three main parts: fixed-content data, system metadata, and annotations (i.e., user-defined or custom metadata). The fixed-content data may be an exact digital reproduction of data as it existed before it was stored. Once it is in the object system, the data typically cannot be modified but might be appendable. The system metadata includes system-managed properties describing the data, such as its size and creation date. The system metadata typically includes policy settings, such as retention or DPL (data protection level), that affect how internal processes interact with the object. The focus of this description will be on the annotations including metadata a user or application provides to further describe an object. As mentioned above, it may be specified as XML and is typically used to make an object self-describing.

Figure 6:
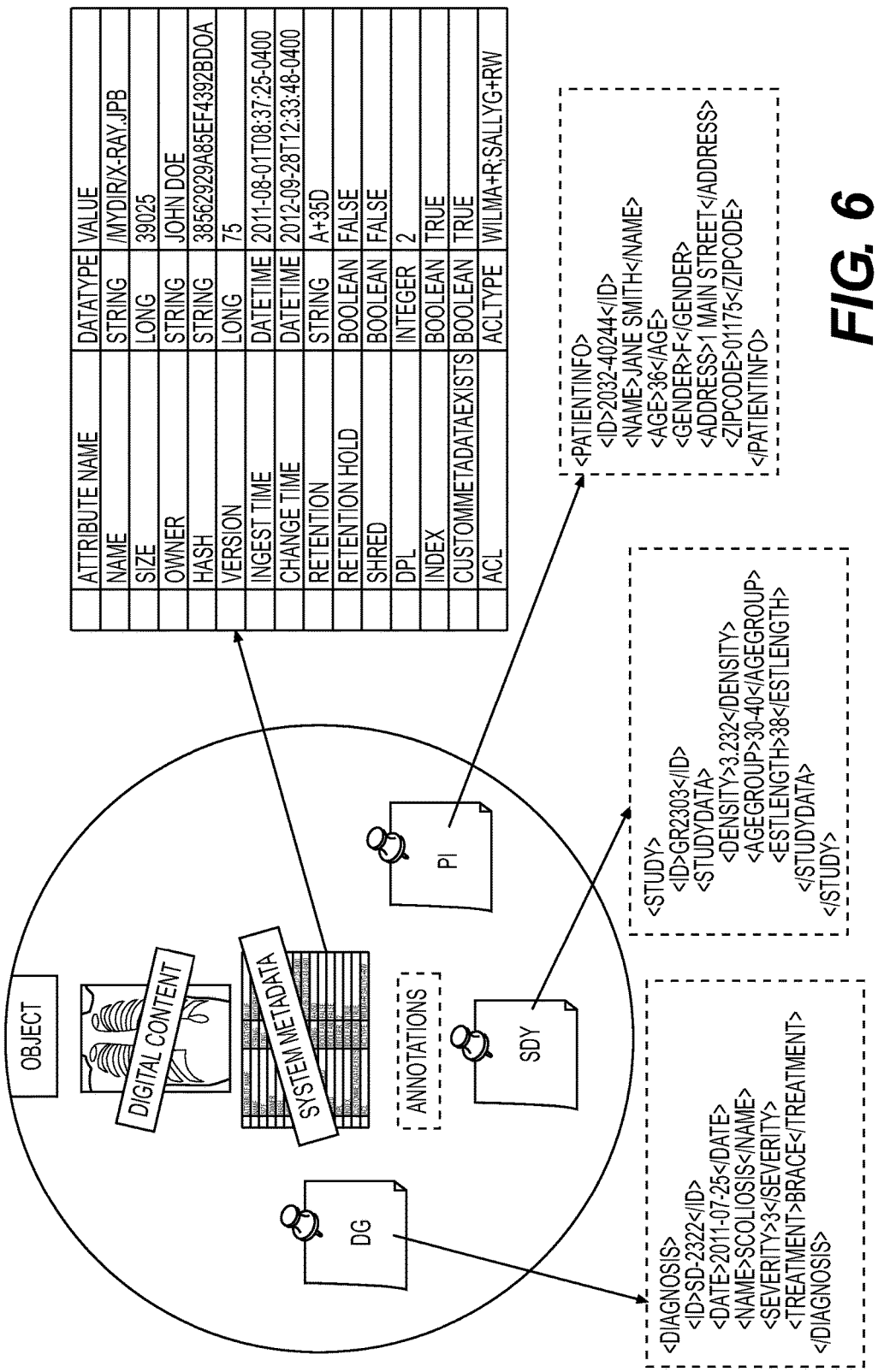
FIG. 6 shows an example of an object having system of metadata and multiple named collections of user-defined metadata herein referred to as annotations.
Figure 7:
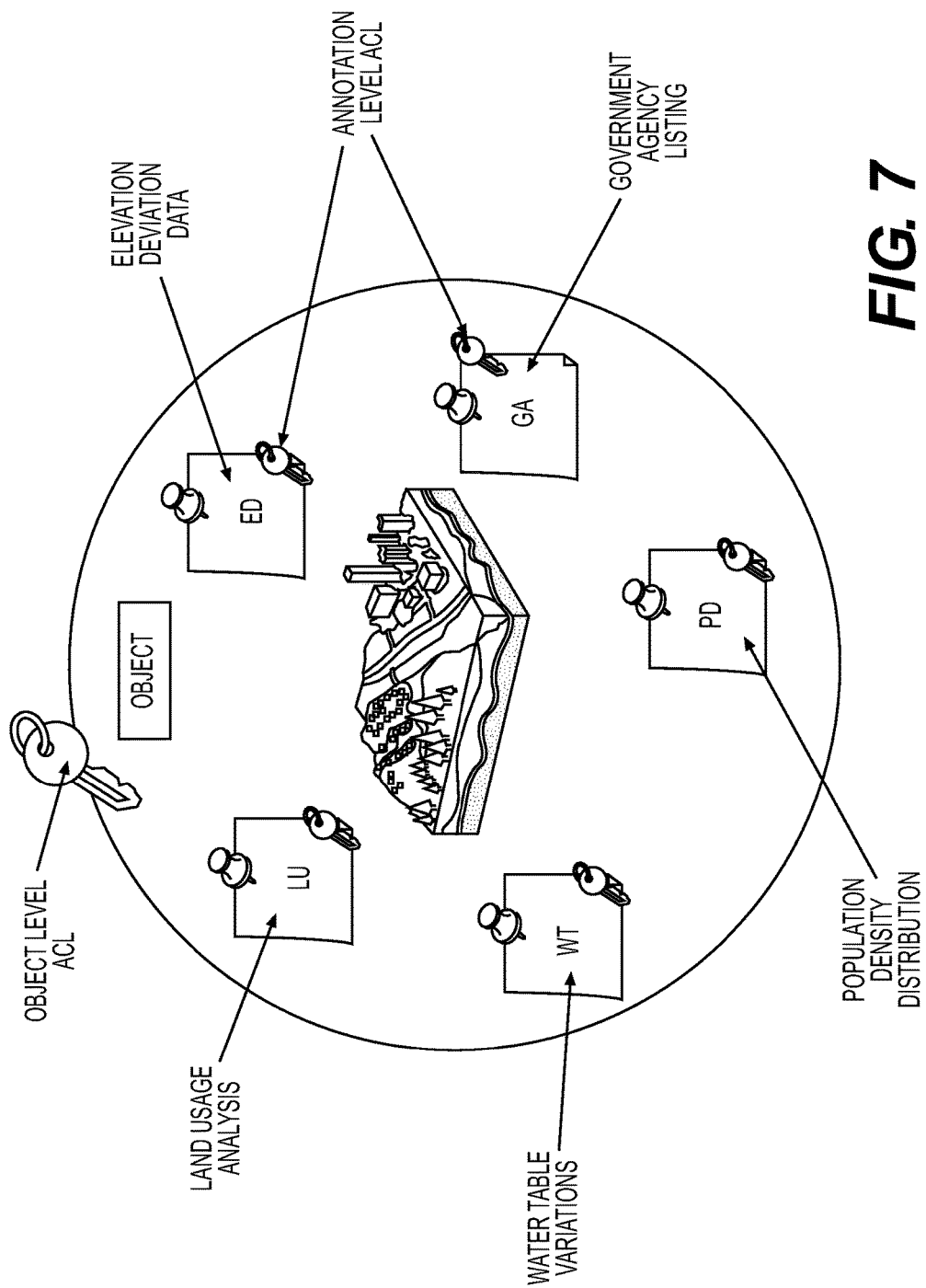
FIG. 7 shows an example of an object having a plurality of annotations and access control lists (ACLs).

FIG. 6 shows an example of an object having system of metadata and multiple named collections of user-defined metadata herein referred to as annotations. FIG. 7 shows an example of an object having a plurality of annotations and access control lists (ACLs). Previously, an object consisted of one unnamed custom-metadata section. This invention provides for multiple named collections or elements of user-defined or custom metadata called annotations. Each named collection of the multiple named collections associated with an object is separately addressable by a single request which includes an addressable unit of the object and qualifying language specifying the particular named collection. While each named collection is separately addressable, it is also possible to have an implementation whereby multiple named collections can be accessed at a time by a request. For illustration purposes, the samples in the description will use freely available open-source command line tool to perform HTTP/REST requests called curl (Command-line Universal Resource Locator). This tool provides a very simple mechanism to perform HTTP requests without utilizing a full web browser. The examples of annotations in FIG. 7 include Land Usage Analysis, Water Table Variations, Population Density Distribution, Government Agency Listing, and Elevation Deviation Data. Each annotation could be generated by a separate program that analyzed the object image as shown. Another example of an annotation of an object is one that links or associates the object to another object.

The object may include an object-level access control list (ACL). In addition, each annotation may include its own annotation-level ACL, so that different annotations may have different ACLs that may be different from the object-level ACL. The annotation-level ACL of an annotation specifies which requester can have access to that annotation.

Once an object exists, the annotations can be added, updated, or deleted utilizing HTTP REST requests. This is performed by specifying, via a controller or a processor of an object system or the like, a URL to the existing object, requesting a PUT operation, and supplying the content of the annotation. The request URL not only provides the object, but also directs the object storage web server to perform the specified operation on which named annotation. Then supplied with the curl command is the annotation content to be used for the operation against the object. The format of the annotation (XML, JSON, binary, etc.) is not dictated by the object storage system; however, for illustration purposes, the annotation content will be represented in XML format. Whether the operation is allowed could depend on the configuration or policies applied to the object storage system. For instance, the object storage may be in read-only mode, may have access restrictions based on user credentials, may have policies not allowing updating existing content, etc. However, for the illustration of the invention, it will be assumed the configuration and policies will allow for free access to objects and their annotations.

Annotation HTTP REST Operations

As previously mentioned, there are a few operations that can be performed against objects and annotations: GET, PUT, DELETE, POST, and HEAD. How to use these operations will be described below.

The first operation creates/replaces an annotation of the object. This is performed by issuing an HTTP PUT operation directed at the existing object and supplying the new annotation content. The following is an example command line to add/replace an annotation named foobar with the content in the annotation.xml file to an existing object object.xxx:

curl -T annotation.xml
"http://ns1.ten1.hcp.example.com/rest/object.xxx?type=custom-metadata&annotation=foobar"

The next operation retrieves an annotation. This is performed by issuing an HTTP GET operation directed at the existing object. The annotation content will be returned in the body of the HTTP GET request response. The following is an example command line to retrieve the annotation named foobar associated with the object.xxx object and display it to the console of the user:

curl "https://ns1.ten1.hcp.example.com/rest/object.xxx?type=custom-metadata&annotation=foobar"

To retrieve the details (i.e., properties) of a specific annotation without retrieving the annotation, the following HTTP HEAD request can be performed against the object providing additional directives on the URL specification. The following is an example curl command to perform display details about the foobar annotation for the object.xxx object:

curl -l "http://ns1.ten1.hcp.example.com/rest/object.xxx?type=custom-metadata&annotation=<foobar>"

The following is an example output from this command:
HTTP/1.1 200 OK
Expires: Thu, 01 Jan 1970 00:00:00 GMT
X-HCP-ServicedBySystem: hcp.example.com
X-HCP-Time: 1348516584
X-HCP-SoftwareVersion: 5.1
X-RequestId: BE4012AB68AF46B
Content-Type: text/xml
Content-Length: 136
X-HCP-Type: annotation
X-HCP-Size: 136
X-HCP-ChangeTimeMilliseconds: 1348511536000.00
X-HCP-ChangeTimeString: 2012-09-24T14:32:16-0400
X-HCP-Hash: MD5 7701F57B64ADD508FB986868790CA4FE
X-HCP-Acls: Public:READ To retrieve a list of all annotations for a given object, another form of an HTTP request is performed. There are two mechanisms that can be utilized. The first is performing an HTTP HEAD or GET request against the object; the response will consist of a simple name/size list. For full information about the annotations, an HTTP GET request can be performed against the object providing an alternative directive in the URL request and the specification of how to present the list. The following is an example command line to retrieve the list of all annotations associated with the object.xxx object and display it to the console of the user in XML format:

curl "https://ns1.ten1.hcp.example.com/rest/object.xxx?type=custom-metadata-info" -H "Accept: application/xml"

An example output of the listing of annotation would consist of the name and relevant object storage metadata about the annotation is the following:

```
<annotations>
    <annotation>
        <name>HDI</name>
        <hash>MD5 3970858C9F1BE83ED9DC6E837BE1D292</hash>
        <changeTimeMilliseconds>1348593706000.00</changeTimeMilliseconds>
        <changeTimeString>2012-09-25T13:21:46-0400</changeTimeString>
        <size>74</size>
        <contentType>text/xml/contentType>
        <acl>Public:READ</acl>
    </annotation>
    <annotation>
        <name>myCustom Metadata</name>
        <hash>MD5 BE83ED9DC6E837BE1D29272721A9F14F</hash>
        <changeTimeMilliseconds>1348603222000.00</changeTimeMilliseconds>
        <changeTimeString>2012-09-25T16:00:22-0400</changeTimeString>
        <size>174</size>
        <contentType>text/xml</contentType>
        <acl>JohnD:READ,WRITE</acl>
    </annotation>
</annotations>
```

Finally, to delete an annotation associated with an object, an HTTP DELETE request is performed. The following is an example command line for removing the foobar annotation from the object.xxx object:

curl -X DELETE
"http://ns1.ten1.hcp.example.com/rest/object.xxx?type=custom-metadata&annotation=foobar"

There are additional/advanced mechanisms for sending and receiving content from object storage systems that also apply to the core API mechanisms shown above. The following are a partial list of the additional mechanisms:

1) Included in the system is an unnamed annotation and this is equal to the prior products' single custom-metadata container. It is included for backward compatibility and can be accessed using the same mechanisms previously mentioned by omitting the "annotation" URL specification of the request.

2) Compression of annotations while transmitting over the network connection can be used.

3) Usage of a single HTTP PUT (write) and HTTP GET operations is provided that allows for a single HTTP operation to be used to write/read both the object fixed content as well as an annotation. This is called Whole I/O in the existing product and was expanded to allow for annotations. These requests can be referred to as Whole I/O PUT request and Whole I/O GET request.

4) Extension to existing query interfaces is used to provide search/indexing reporting to include annotation information.

5) The features mentioned above are not limited to the HTTP/REST API described above, but are also utilized in the Web-Based GUI interface for the product.

Figure 8:
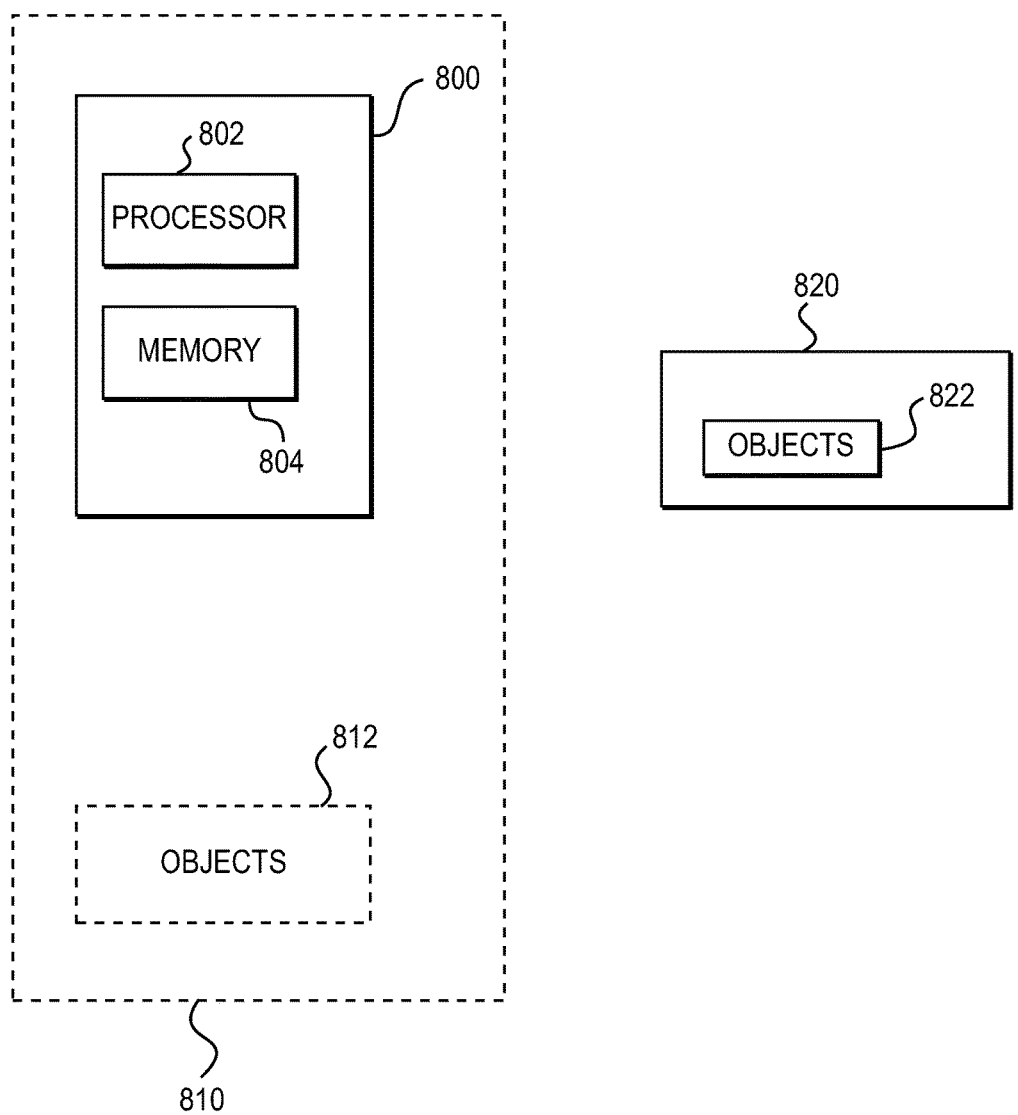
FIG. 8 shows an example of an apparatus for implementing the use of multiple annotations for an object.

FIG. 8 shows an example of an apparatus for implementing the use of multiple annotations for an object. The apparatus 800 may be part of an object system (810 shown in broken lines) where the objects (812 shown in broken lines) are stored, or part of a management computer separate from a system 820 for storing the objects 822, or part of a system in a redundant array of independent nodes as described above (see FIGS. 1-4), or the like. The apparatus 800 includes a processor or controller 802 and a memory 804, and is operable to perform operations on the annotations (e.g., PUT, GET, HEAD, POST, DELETE, Whole I/O PUT, Whole I/O GET), including the creation or updating of the access control lists (ACLs) of the annotations.

IV. Content Classes

Figure 9:
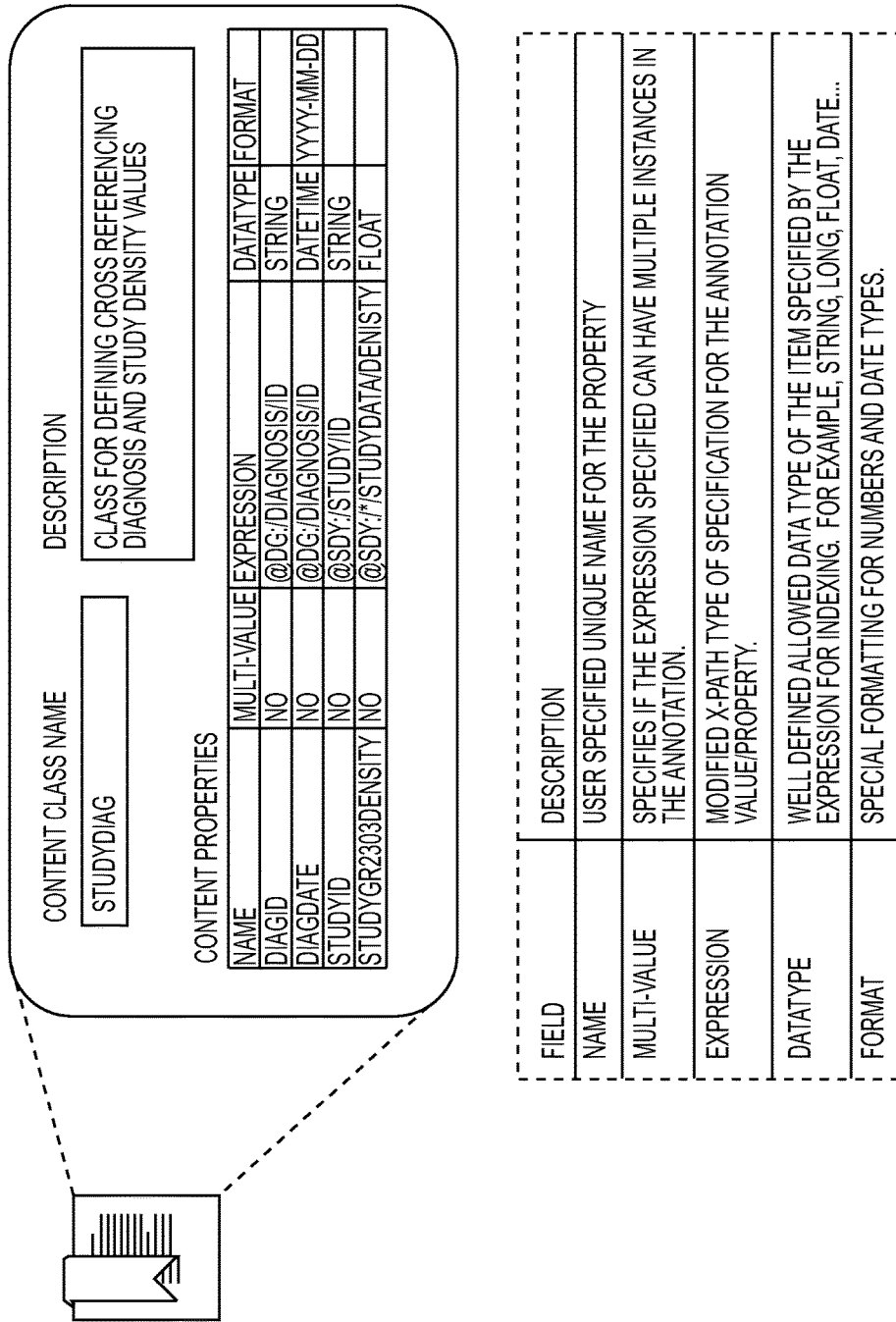
FIG. 9 shows an example of a content class definition.

FIG. 9 shows an example of a content class definition. Embodiments of this invention utilize "Content Classes" as a mechanism to define a blueprint that will construct structure to the unstructured content of an object and its metadata. These classes consist of a set of user-defined "Content Properties." Each content property provides the ability to extract a specific metadata field from objects (e.g., any custom metadata XML tag), index it efficiently under a user-defined name with strong typing, and make that field multi-dimensionally query-able via a user interface and a programmatic query interface. Content classes will group and organize a set of content properties into named categories. Because each content class is named, the user interface and programmatic interface can reference these content classes to make it simpler to construct queries on the unstructured content.

The example in FIG. 9 has content properties fields for Name, Multi-Value, Expression, Data Type, and Format. The Name field is for a user specified unique name for the content property, which is preferably a human-meaningful name that can be used for query. The Multi-Value field is used to specify whether the expression specified can have multiple instances in the annotation (i.e., to indicate whether the property can evaluate to multiple values within the same custom metadata content). The Expression field identifies how the content property's value should be extracted from the custom metadata content. When the custom metadata is in XML format, the expression would be in XPath syntax. The expression is a modified X-Path type of specification for the annotation value/property. The Data Type field is for a well-defined allowed data type of the item specified by the expression for indexing, i.e., the expected data-type for the custom property (e.g., String, Tokenized Text, Boolean, Integer, Float, and Date). The Format field is for special formatting for numbers and date data types. This option allows the users to select an expected format for properties of type DATE, INTEGER, and FLOAT. These fields are attributes of the content properties when defined as part of the content class definition.

Figure 10:
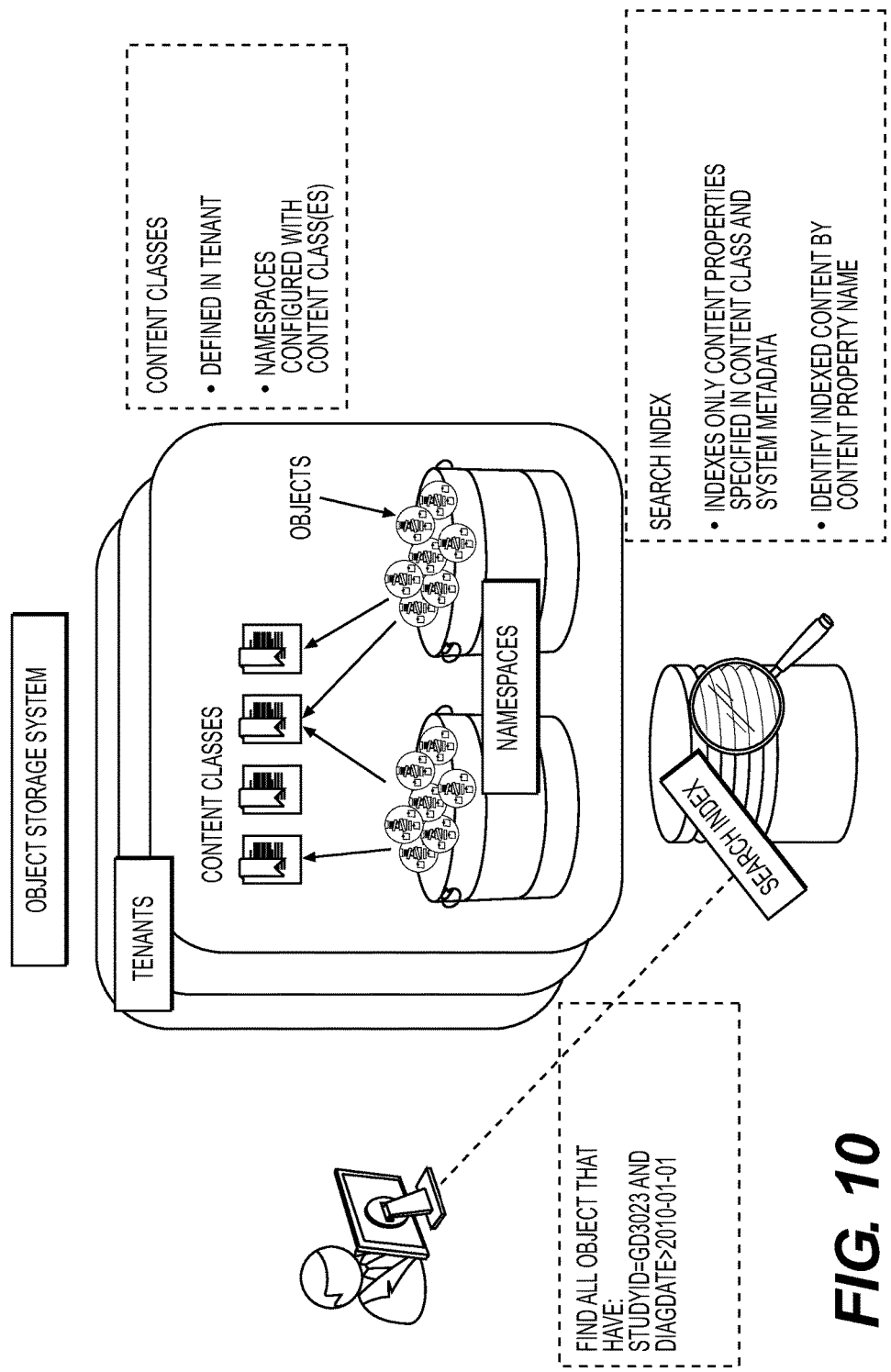
FIG. 10 shows an example of a system that utilizes content classes in an indexing system.

FIG. 10 shows an example of a system that utilizes content classes in an indexing system. Because specific applications typically generate metadata with the same schema, content classes help to define, package, and manage these definitions across an object storage ecosystem, thereby eliminating the need to define duplicate sets of content properties across each tenant (i.e., virtual object store) and its namespaces (i.e., object container) which an application uses. Each tenant can utilize these content classes to obtain the desired indexing behavior for each of its namespaces.

Furthermore, the search indexing system indexes only content properties specified in the content classes and system metadata, and can identify indexed content by the content property names.

Application developers may make a content class definition available for any tenant hosting a specific application, as this definition will likely not change unless the application changes. Preferably, a consumer of the content classes may opt-in or out of using a content class in order to maximize indexing performance and resource consumption.

The query engine index in the object storage system is global to the entire system, and consumes resources. To assist administrators in minimizing the cost of these indexing resources, content classes provide a means to view content property configurations across all namespaces in a tenant from a single location (instead of viewing each configuration at each individual namespace). This allows for simplified de-duping (de-duplicating) of index fields across various schemas. For example, if two different content classes both define a "Doctor Name" field, it may be beneficial for both properties to share the same index field name so that the values are effectively de-duped (de-duplicated) in the index.

The following describes features of the invention using an example of an object storage system that stores a large number of medical images. Each of these images has custom metadata (e.g., XML based) which provides basic contact information for the doctors who have examined the image, and the patient with whom the image is associated. Consider the following snippet of custom metadata:

```
<record>
    <doctor>
        <id>12345</id>
        <name>John Smith</name>
        <address>1234 Main Street Boston, MA 02215</address>
    </doctor>
    <patient>
        <id>56789</id>
        <name>John Smith</name>
        <address>567 Lincoln St Waltham, MA 03786</address>
            <dateOfBirth>1/2/1970</dateOfBirth>
    <patient>
</record>
```

A typical Indexing/Search approach will allow users to query for individual keywords and phrases within their custom metadata. It would not consider the structure of the custom metadata while indexing. In this example, it would be impossible for the user to accurately perform a query on the name of the doctor. A query on "John Smith" would return all images examined by Dr. John Smith as well as all images associated with John Smith the patient, including images examined by other doctors. Moreover, it would be impossible to find objects by using value ranges (e.g., to find all patients of a specific age based on their dates of birth). Additionally, a typical Indexing/Search system has an all or nothing approach to indexing custom metadata content, giving the user very little control over the size of their index. When enabled, all custom metadata content is indexed, including information that the user may not be interested in searching. This can lead to a bloated index size, which has negative implications on disk and RAM utilization across the system.

Content Classes solve all those problems by letting the user specify content properties to be used when indexing and searching custom metadata content. Content properties describe a particular attribute which may be contained in the custom metadata on objects, as well as information about the structure of this metadata in the form of an expression (using XPath syntax). In the previous example, an administrator familiar with the structure of the custom metadata could define the following content properties:

| Expression | Name | Type |
| --- | --- | --- |
| [/record/doctor/name] | [Doctor] | [String] |
| [/record/patient/name] | [Patient] | [String] |
| [/record/patient/dateOfBirth] | [DOB] | [Date] |

These content properties will then be used to extract specific values from the content of the custom metadata for indexing as well as for searching. For example, the content property with content property Name "Doctor" provides the ability to extract the specific metadata field under /record/doctor/name from the objects. This will permit queries against the defined object properties. For example, Doctor: "John Smith" will return only the images examined by Dr. John Smith. Images associated with the patient named John Smith will not be returned by the query. This permits users to perform focused, structured queries on their custom metadata. In another example, DOB:[January 1, 1940 TO January 1, 1980] will return only the images for patients between born between 1940 and 1980.

This also means that only the values the user considers useful for search will be indexed. If the user is not interested in indexing any other values from the object's custom metadata, then the index size will be limited to just those three fields per object, regardless of how large the entire custom metadata is, thus providing significant disk and RAM space savings and boosting performance.

Additionally, the index can be efficiently "de-duped" within the namespace or even across namespaces, in case when the same values are expressed differently in custom metadata formats. For example, consider the situation where the same custom metadata was formatted differently in different namespaces. One namespace could format their custom metadata as follows:

```
<doctor>
    <name>John Smith</name>
</doctor>
```

Another namespace could format their custom metadata as follows:

```
<physician>
    <fullname>John Smith</fullname>
</physician>
```

The administrator could direct both values to the same index field:

| Expression | Name | Type |
| --- | --- | --- |
| [/doctor/name] | [Doctor] | [String] |
| [/physician/fullname] | [Doctor] | [String] |

This allows for uniform searches. A query for Doctor: "John Smith" will find the objects with both custom metadata formats, and again, allows for significant disk and RAM savings, thus boosting performance.

Indexing and Searching

When an object storage system indexes custom metadata content, it looks up content classes that are applicable for the object being indexed, finds content properties that are defined in those content classes, and applies those content properties to the content. When doing so, it evaluates the expressions of all content properties against the content being indexed and indexes only the values that the expressions matched, using their appropriate format and data type.

When searching for objects in the object storage system, the user can search for content using any of the defined content properties, using property's user friendly name (e.g., Doctor in the above example). The system matches the property name to the internal index field to find appropriate result (e.g., Doctor:"John Smith"). To assist users with searching, the system preferably offers the user a list of appropriate content classes and content properties to be chosen from in an intuitive graphical user interface (for instance, using a drop-down list/menu).

An apparatus similar to that shown in FIG. 8 may be used to implement the indexing/searching feature utilizing content properties grouped into content classes. For example, the search indexing system described above may be implemented as a module stored in the memory 804 for execution by the processor or controller 802 to perform the indexing and searching described above.

If annotations (i.e., collections of user-defined metadata associated with an object), the content classes allow for the specification of annotation elements that are of interest for indexing/search capabilities. The content classes include specification of specific named annotations as well. This provides for a very powerful tool for indexing content based on the application/customer provided annotations.

With this advanced search/indexing capabilities, it is possible to construct an analytic engine that can walk through all the content and its annotations produced by multiple applications to find patterns that can potentially identify events of interest. It is possible then to add additional annotations to help form a relationship between seemingly unrelated collections of data. For example, the object storage system was populated with many geospatial images. These images, to be useful, require information that could be extracted by different software. Such useful information could be cloud coverage. While one software may be able to analyze the image as to the percentage of cloud coverage, yet another piece of software could analyze these results to determine if the images can be corrected or need to be recaptured to provide a cloud free image set. This could also be utilized where images with cloud coverage below a threshold could be candidates for further analysis for changes in geographic features or human based activity/objects. Annotations could be added to identify items such as terrorist activities.

This same dual purpose data could be used in the health care industry. A lot of data is collected based on testing and results for individual well-being. This data augmented with different classes of information could help link various diagnosis, geographic location, and resolution procedure to formulate a study based on all the different attributes that may have been collected by different software/procedures. These studies in turn could add additional annotations to the objects to facilitate additional usages such as, for instance, whether a certain procedure in general has produced the most favorable outcomes.

Another example would be to have a process that walks through annotation data provided by other applications and determine content life-cycle events. For example, it can be used to decide what information is no longer required to keep around by law and does not serve a purpose for the intended usage of the dataset. This will produce a more focused dataset for either specialized usage or re-sell to customers.

Of course, the system configurations illustrated in FIGS. 1, 4, and 8 are purely exemplary of systems including content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing a mechanism called content classes to define a blueprint that will construct structure to the unstructured content of an object and its metadata and to facilitate efficient indexing and searching. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An apparatus which manages a plurality of objects, each object including content data and metadata, the apparatus comprising:
    a processor; and
    a memory that stores a program, which when executed by the processor, programs the processor to:
        generate an index for the objects using a plurality of content properties including a first content property and a second content property, the first content property having a first name of the first content property and first expression information for extracting values from fields in the metadata of one or more of the objects, and the second content property having the first name and second expression information for extracting values from the fields in the metadata of one or more of the objects so that at least a portion of the index is deduplicated such that values for multiple relevant expressions are able to be returned for a single search request;
        upon receipt of a search request including the first name and a first value, search the index for one or more objects that have at least one of:
            the first value in at least one of the fields identified based on the first expression information in the metadata, or
            the first value in at least one of the fields identified based on the second expression information in the metadata; and
        based on finding a plurality of matches, return an indication of at least one of the objects determined to include the first value in at least one of the fields identified in the metadata based on the first expression information or in at least one of the fields identified in the metadata based on the second expression information.

2. An apparatus according to claim 1, wherein the processor is further configured to manage a content class having a plurality of content properties which includes the first content property and the second content property.

3. An apparatus according to claim 2,
    wherein the objects are stored in a plurality of namespaces which are logically partitioned storage spaces, and
    wherein the content class is associated with the plurality of namespaces to avoid duplication of the plurality of content properties across the plurality of namespaces.

4. An apparatus according to claim 1, wherein the first content property further includes a first data type which defines a data type allowed in the first field identified by the first expression information.

5. An apparatus according to claim 1, wherein the metadata includes a plurality of annotations of the content data, the annotations including a first annotation generated by a first application and a second annotation generated by a second application.

6. An apparatus according to claim 5, wherein the processor is configured to manage a first access control list (ACL) which is used to control restriction of access to the object and a second ACL which is used to control restriction of access to the plurality of annotations.

7. An apparatus according to claim 5, wherein the processor is configured to update or delete the plurality of annotations upon receipt of a HTTP REST request.

8. A method for an apparatus which manages a plurality of objects, each object including content data and metadata, the method comprising:
    generating an index for the objects using a plurality of content properties including a first content property and a second content property, the first content property having a first name of the first content property and first expression information for extracting values from fields in the metadata of one or more of the objects, and the second content property having the first name and second expression information for extracting values from the fields in the metadata of one or more of the objects so that at least a portion of the index is deduplicated such that values for multiple relevant expressions are able to be returned for a single search request; and
    searching, upon receipt of a search request including the first name and a first value, the index for one or more objects that have at least one of:
        the first value in at least one of the fields identified based on the first expression information in the metadata, or
        the first value in at least one of the fields identified based on the second expression information in the metadata; and
    based on finding at least one match, returning an indication of at least one of the objects determined to include the first value in at least one of the fields identified in the metadata based on the first expression information or in at least one of the fields identified in the metadata based on the second expression information.

9. A method according to claim 8 further comprising: managing a content class having a plurality of content properties which includes the first content property and the second content property.

10. A method according to claim 9,
    wherein the objects are stored in a plurality of namespaces which are logical partitioned storage spaces, and
    wherein the content class is associated with the plurality of namespaces to avoid duplication of the plurality of content properties across the plurality of namespaces.

11. A method according to claim 8,
    wherein the first content property further includes a first data type which defines a data type allowed in the first field identified by the first expression information.

12. A method according to claim 8, wherein the metadata includes a plurality of annotations of the content data, the annotations including a first annotation generated by a first application and a second annotation generated by a second application.

13. A method according to claim 12 further comprising:
    managing a first access control list (ACL) which is used to control restriction of access to the object and a second ACL which is used to control restriction of access to the plurality of annotations.

14. A method according to claim 12 further comprising:
    updating or deleting the plurality of annotations upon receipt of a HTTP REST request.

15. A computer-readable storage medium storing a plurality of instructions for controlling a processor in an apparatus which manages a plurality of objects, each object including content data and metadata, the plurality of instructions comprising:
- generating an index for the objects, the index including a plurality of content properties including a first content property and a second content property, the first content property having a first name of the first content property and first expression information for extracting values from fields in the metadata of one or more of the objects, and the second content property having the first name and second expression information for extracting values from the fields in the metadata of one or more of the objects so that at least a portion of the index is deduplicated such that values for multiple relevant expressions are able to be returned for a single search request; and
- searching, upon receipt of a search request including the first name and a first value, the index for one or more objects that have at least one of:
  - the first value in at least one of the fields identified based on the first expression information in the metadata, or
  - the first value in at least one of the fields identified based on the second expression information in the metadata; and
- based on finding at least one match, returning an indication of at least one of the objects determined to include the first value in at least one of the fields identified in the metadata based on the first expression information or in at least one of the fields identified in the metadata based on the second expression information.

16. A computer-readable storage medium according to claim 15, wherein the plurality of instructions further comprising:
- managing a content class having a plurality of content properties which includes the first content property and the second content property.

17. A computer-readable storage medium according to claim 16,
- wherein the objects are stored in a plurality of namespaces which are logical partitioned storage spaces, and
- wherein the content class is associated with the plurality of namespaces to avoid duplication of the plurality of content properties across the plurality of namespaces.

18. A computer-readable storage medium according to claim 15, wherein the first content property further includes a first data type which defines a data type allowed in the first field identified by the first expression information.

19. A computer-readable storage medium according to claim 15, wherein the metadata includes a plurality of annotations of the content data, the annotations including a first annotation generated by a first application and a second annotation generated by a second application.

20. A computer-readable storage medium according to claim 15, wherein the plurality of instructions further comprise managing a first access control list (ACL) which is used to control restriction of access to the object and a second ACL which is used to control restriction of access to the plurality of annotations.

* * * * *